Oct. 30, 1962  R. A. KRAÜS ET AL  3,060,787
QUICK OPERABLE FASTENER WITH COIL SPRING RETAINING MEANS
Filed Oct. 11, 1957
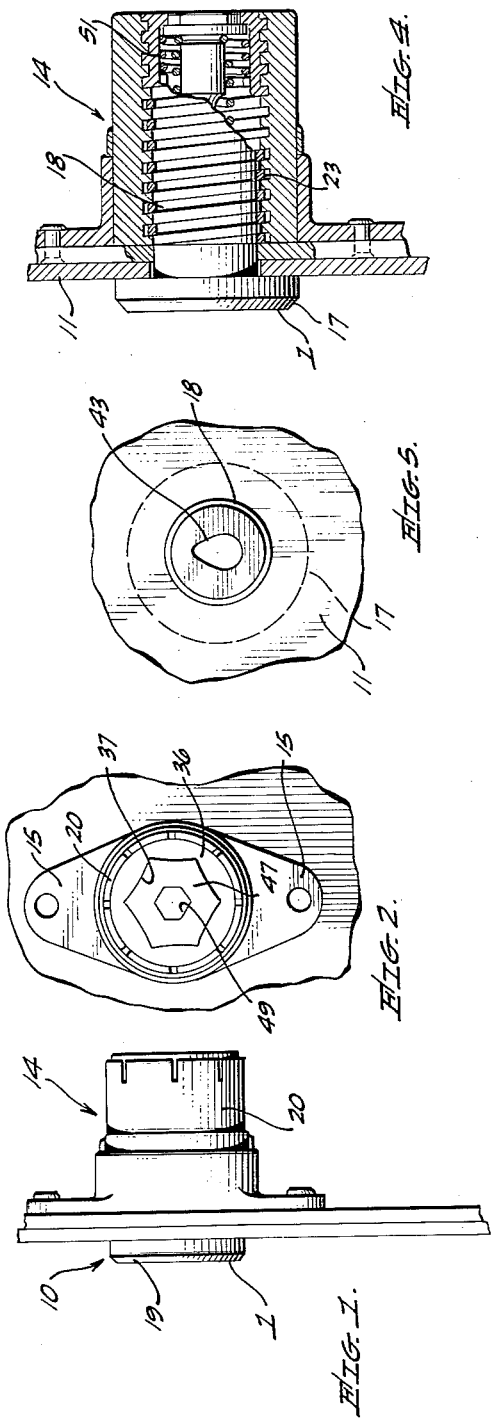
INVENTORS.
ROBERT A. KRAUS,
EDMUND J. KRAUS,
BY
ATTORNEY.

United States Patent Office 3,060,787  
Patented Oct. 30, 1962

3,060,787  
QUICK OPERABLE FASTENER WITH COIL SPRING RETAINING MEANS  
Robert A. Kraus and Edmund J. Kraus, Redondo Beach, Calif., assignors to Deutsch Fastener Corporation, Gardena, Calif., a corporation of California  
Filed Oct. 11, 1957, Ser. No. 689,617  
4 Claims. (Cl. 85—33)

This invention relates to fasteners and more particularly to fastening devices of the quick attachable and detachable type.

An object of this invention is to provide a quick opening fastener which will carry both tension and shear from one structural member to another, which is necessary, for example, in connecting and securing sheet metal cover plates, cowling and the like in place on aircraft structures.

Another object of the present invention is to provide a fastener device which may be attached and detached by a partial turn of the bolt and wherein the bolt holding portion of the device can be adjusted so that plates or articles of varying thickness can be fastened.

A further object of the present invention is to provide a quick opening fastener which will lock in the fastened position and which will not be loosened by vibrations occurring in the fastener or fastened objects.

Among the further objects of the present invention is to provide a partial turn quick operable fastener which has improved co-action between the separable parts to assure an optimum grip and a maximum of shear and tension surfaces in the fastener.

A quick operable fastener in accordance with this invention includes a bolt having male threads of a predetermined depth on the shank thereof. A socket having female threads of a depth greater than the depth of the male bolt threads is adapted to receive the bolt through a first end of the socket without engagement of the threads. A helical coil is mateable with the female threads of the socket and is affixed at one end to the socket proximate the first end of the socket. The helical coil has a cross-sectional thickness substantially equal to but less than the depth of the female threads and is mateable therewith. The second end of the helical coil is abutted against a tubular member which is male threaded and threadably mateable with the female threads of the socket. The tubular member extends inward from the second end of the socket such that the male threads are coextensive with the coil within the female threads. A key member is spring loaded into non-rotatable engagement with the tubular member. The key member extends into the socket beyond the tubular member to non-rotatably engage the bolt when the bolt is in the inserted position within the socket.

The novel features which are believed to be characteristic of the invention, both as to its organization and method of operation, together with further objects and advantages thereof, will be better understood from the following description considered in connection with the accompanying drawing, in which a presently preferred embodiment of the invention is illustrated by way of example. It is to be expressly understood, however, that the drawing is for the purpose of illustration and description only, and is not intended as a definition of the limits of the invention.

FIGURE 1 is a view in elevation of the assembled fastener as used to connect two sheet metal plates;

FIGURE 2 is a view taken along line 2—2 of FIGURE 1;

FIGURE 3 is an exploded view partly in section of the various components of the fastener;

FIGURE 4 is a partial sectional view of the fastener in assembled position taken along line 4—4 of FIGURE 1; and FIGURE 5 is a plane view partly in section showing the end of the bolt as engaged by the key member.

Referring now to the drawing, in the presently preferred embodiment of this invention square threads are used throughout on threaded parts to furnish an optimum amount of bearing surfaces to resist tension loads exerted upon the bolt. It is to be understood, however, that the invention is equally applicable to other thread configurations. Referring now particularly to FIGURES 1 and 3, a bolt 10 is shown extended through a sheet metal plate 11 which is to be fastened to a second sheet metal plate 12. The bolt receiving or receptacle portion 14 of the fastener is affixed by rivets or other similar means to the second metal plate opposite the sides of the plates to be joined. In the embodiment shown, a pair of ears 15 are affixed to the receptacle and rivets are fastened through the ears to the plate 12. Openings are provided through the sheet metal which are greater in diameter than the shank 16 of the bolt, but less in diameter than the head, to allow insertion of the bolt through the plates and into the receptacle while allowing the head 17, or a washer placed thereunder, to be in bearing and holding contact with the first plate 11 to fasten it against the second plate 12.

The bolt 10 is male threaded with square threads along the major portion of the length of the shank 16 and at least along the length of shank to be engaged. The male threads 18 are formed to a predetermined depth which is less than the depth of the female threads of the socket as discussed hereinafter. Turning means such as a slot 19 are provided at the head of the bolt.

The receptacle 14 includes a substantially tubular socket 20 having a female threaded inside diameter substantially equal to but greater than the outside diameter of the threaded shank 17, i.e., equal to or greater in diameter than the diameter of the male threads 18 across the crest of the threads. Thus, the bolt 10 is freely insertable into the socket without engagement between the male threads 18 of the bolt and the female threads 21 of the socket. The depth of the square female threads in the socket is greater than the depth of the male threads on the bolt. The pitch of the female threads and the distance across flats is, however, substantially equal to that of the male threads and the tubular socket is threaded throughout its length.

A helical engaging coil 23 is formed of resilient material and is thus, a helical coil spring. The coil is formed such that when it is in the relaxed condition its inside diameter is equal to or less than the minor or root diameter of the male threads 18 of the bolt 10. The coil is of square cross-section substantially equal to the groove of the female threads. That is, the cross-section of the turns of the coil is substantially equal to thickness to the depth of the female threads 21 and substantially equal in width to the width of the grooves of the threads. Accordingly, the helical coil is mateable with the female threads and when inserted therein in the compressed condition as discussed hereinafter, has an inside diameter substantially equal to but greater than the inside diameter of the female threads. Thus, with the coil 23 in place in the threads of the socket, a substantially continuous cylindrical surface is defined by the socket into which the bolt can be inserted without engagement. The first end 24 of the coil is affixed to the socket within the groove of the female thread proximate the first end 25 of the socket which is that end of the socket into which the bolt is received. The end 24 of the coil may be fixed by crimping the thread, spot welding, or other means known to the art.

A tubular member 27 is male threaded to be mateable with the female threads of the socket and is insertable into the second end 28 of the socket. The inner end 29 of the tubular member is spirally formed at the pitch of the threads thereon to terminate in a shoulder 30 which is substantially perpendicular and is mateable with the second end 31 of the helical coil. The length of the tubular member and number of threads 32 thereon is interdependent upon the length of the bolt and number of turns of the helical coil and is determined such that the inner end 29 of the tubular member is proximate to but beneath the threads of the bolt when the bolt is in the fully inserted position within the socket. Thus, the number of turns of the helical coil is sufficient to extend from the fixed end 24 of the coil to a position slightly beyond the threaded end of the bolt when the bolt is in the fully inserted position as shown in FIGURE 4. Accordingly, when the tubular member and helical coil are inserted within the socket the outer end 34 of the tubular member substantially coincides with the end 28 of the socket and the male threads 32 of the tubular member and the helical coil are continuous within the female threads. The end 31 of the coil thus abuts against the shoulder 30 of the threads 27 of the tubular member. By rotating the tubular member a compressive force is exerted upon the end 31 of the coil to cause the coil to move fully within the female threads.

The internal configuration of the tubular member is generally cylindrical, but with a shoulder 35 provided by an inwardly directed flange 36 at the outer end of the tubular member. By its inner configuration the flange in turn defines a non-circular opening which is hexagonal in this embodiment. Thus, the inwardly flanged outer end of the tubular member defines an opening 37 therethrough which is hexagonal with the flange providing a shoulder 35. A second inwardly directed fragmentary flange or ears 38 are provided proximate the inner end of the tubular member as a support for the spring 50 as described hereinafter. The ears, however, extend inwardly a substantially lesser distance than the flange 36. A key member 40 is provided with a shank 41 which is greater in length than the length of the tubular member and is adapted to extend therethrough. As shown in FIGURES 3 and 5 the inner portion 42 of the shank 41 is formed to a non-circular configuration to act as a key which nonrotatably engages the bolt 10. Thus, in this embodiment an elliptically shaped opening or keyway 43 is provided in the shank 16 of the bolt 10 extending from the inner end 44 of the bolt. The key section 42 of the shank 41 of the key member 40 is then formed to a similar non-circular configuration which is nonrotatably mateable with the shank 16 of the bolt 10. Therefore, when the key member is inserted into the bolt, the bolt 10 and key member 40 are non-rotatably engaged. The head 46 of the key member is mateable with the inside diameter of the tubular member such that it can be inserted therein and bear against the shoulder 35. That is, it has a diameter small enough to be passed over the ears 38 but great enough that it cannot pass through the hexagonal opening 37. An engaging portion 47 of the head is formed upon the surface of the head 46 and is non rotatably mateable with the hexagonal opening 37. The thickness of the engaging portion of the head is substantially equal to the thickness of the flange 36 in this embodiment and a non-circular engaging opening is provided in the outer surface of the engaging section 47. For example, a hexagonal opening 49 or slot is provided such that the key member can be turned by an Allen wrench, screwdriver, or the like. A conical spring 50 is provided to maintain the key member in spring loaded non-rotatable engagement with the tubular member. Thus, the spring 50 has a coil diameter at the inner end 51 of the spring which is substantially equal to the inside diameter of the tubular member such that it will be retained by the ears 38. The coil diameter at the outer end 52 of the spring 50 is substantially greater than the greatest diameter of the shank 41 of the key member 40. A bolt tensioning spring 54 is also provided and has an inside diameter greater than the diameter of the shank, but the outside diameter is less than the smallest diameter of the key loading spring 50 in this embodiment. The bolt tensioning spring 54 is of greater length than the shank 41 of the key member in the relaxed condition, but is compressible to a substantially lesser length. The key loading spring 50 is such that it will retain the engaging section of the head in engagement with the hexagonal opening when positioned between the ears 38 and the inner side of the head 46 of the key member, while being compressible sufficiently to allow the head of the key member to be moved inward out of engagement with the hexagonal opening 37 and rotated within the tubular member. In order to retain the spring 54, a recess 56 is provided at the outer end of the shank 41 adjacent the inner surface of the head 46. The outer end 55 of the spring 54 is crimped to be mateable with, and retained by, the recess 56.

Accordingly, in order to assemble the tubular member and key member sub-assembly, the key member is inserted into the inner end 29 of the tubular member, past the ears 38 and into bearing engagement between the head 46 and shoulder 35. At this position the engaging section 47 of the head 46 is engaged with the hexagonal opening 37. The key loading spring is then worked past the ears 38 and slightly compressed and released such that the inner end 51 of the spring rests upon and is retained by the ears with the outer end in bearing contact with the head 46. The bolt tensioning spring 54 is then placed over the shank until the end 55 is retained in the recess 56.

The receptacle is then assembled by inserting the tubular member and key member together with the helical coil into the female threads and affixing the first end of the coil as discussed hereinbefore. In order to prevent free rotation of the tubular member a friction fit between the tubular member and the socket is provided. In this embodiment a friction fit is obtained by crimping the outer end 28 of the socket slightly inward. Thus, to assemble the receptacle the tubular member 27 with the key member 40 and springs 50 and 54 assembled is turned downward from the first to the second end of the socket, until the outer end 34 of the tubular member is substantially flush with the outer end 28 of the socket. The helical coil is turned downward into the socket until the second end 31 of the coil abuts the shoulder 30 of the tubular member. The first end 24 of the helical coil 23 is then fixed and the receptacle is in the assembled condition.

In operation, therefore, referring to FIGURES 3, 4 and 5, the assembled receptacle, as shown in FIGURES 1 and 2 is affixed to one surface of the plate 12 as described hereinbefore. The plate 11 to be fastened is placed against the plate 12 and the bolt 10 is extended through the openings in the plate and inserted into the socket. To insert the bolt 10 into the socket the end 31 of the helical coil 23 is rotated upward to expand the diameter of the coil and position it fully within the grooves of the female threads 21 as described hereinbefore. This expansion of the diameter of the coil is accomplished by rotation of tubular member 27 so as to move it inwardly of socket 20. This causes shoulder 30 of member 27 to engage end 31 of coil 23, rotating the coil with member 27. The coil, by being fixed at end 24, is thereby caused to expand diametrically (while contracting axially) into engagement with the grooves in female threads 21. Thus, the bolt is freely receivable into the socket without engagement of the threads of the bolt with diametrically expanded coil 23. However, as the bolt approaches the fully inserted position of FIGURE 1 it is necessary to compress the bolt tensioning spring 54. Also as the bolt approaches the fully inserted position it must receive the key section 42 of the key member 40 into the keyway 43 with which it is mateable. Since the key will enter the keyway in only one position the bolt is rotated until the key slides into the keyway. The bolt 10 and key member 40 are then engaged such that they are not rotatable with respect to each other but are slidable longitudinally. Further, rotation of the bolt will therefore cause the key member 40 to be rotated. The key member 40 is in turn non-rotatably engaged with the tubular member 27 since the engaging section 47 of the head is mated with the hexagonal opening 37 of the tubular member. Accordingly, rotation of the bolt 10 rotates the tubular member 27. The bolt 10 is rotated clockwise in the figures such that the tubular member 27 is rotated downward in FIGURE 3 or toward the end 28 of the socket. Rotation of the tubular member toward the end 28 of the socket allows the free end 31 of the helical coil 23 to move in the same direction. Since the first end 24 of the helical coil 23 is fixed and the coil is of fixed length, it will be reduced in diameter as the second end 31 is moved away from the first end 24 and the coil returns to its normal diameter. As the diameter of the helical coil decreases, it engages the male threads 18 of the bolt and will continue to move into the groove of the male threads until the inner surface of the coil rests against the root of the male threads. The depth of the male threads is less than that of the female threads and the thickness of the helical coil. Therefore, when the coil is resting upon the root of the male threads it still extends into the female threads and the bolt is in the fully engaged position as shown in FIGURE 4. It should be noted that after the bolt 10 has been inserted sufficiently into the socket to engage the key member, the movement of the helical coil from the disengaged position to the fully engaged position occurs during less than one turn of the bolt and will normally occur in approximately one-quarter turn unless otherwise adjusted as described hereinafter. It should be noted that the free end 31 of the spring can be affixed to the shoulder 30 to cause a positive expansion or contraction of the coil.

In order to adjust the fastener to accommodate plates of different thickness which are to be fastened, it is necessary only to depress the key member until the engaging section 47 is out of engagement with the opening 37 in the tubular member. The key member is then rotated to place the key 42 at the proper radial position of engagement with the bolt at which the threads of the bolt are mateable with the coil at the required depth of insertion of the bolt. That is, for example, if the fastener has been set to fasten a plate 11 of one thickness as in FIGURE 4, and it is now necessary to fasten a different plate of slightly greater thickness, the fastener can be adjusted to accommodate this increased thickness. It may be seen that the bolt cannot reach the same depth within the socket since the head 17 is in bearing contact with the plate 11 at a different height than before. Also, if the bolt is maintained in the same radial position as in FIGURE 4 by the key, the threads of the bolt would not align with the coil. The orientation of the bolt is, therefore, changed by rotating the key to the position at which the male threads of the bolt align with the coil when the head reaches the plate 11. Rotation of the bolt through a partial turn then rotates the key and tubular member as before, allows the coil to move into engagement and tightens and locks the bolt in position. Thus, if the change in position of the bolt which is required in order to fasten the plate is less than the advance of one thread the key is rotated to the position at which the threads of the coil will mate with those of the bolt for that longitudinal position of the bolt. Similarly, if the bolt is fastened by using one-quarter turn and it is desired to have it fasten in one-half turn, for example, for the same thickness of plate, the key can be adjusted to accomplish this by requiring the bolt to make one-half turn after engaging the key before the coil is mated and moved into full contact. In addition to the adjustment within the distance of the advancement of one thread, the fastener will engage and lock at any longitudinal position at which the bolt engages the key by mating with fewer or more turns of the coil. That is, if the fastener is used to join a plate 11 of relatively great thickness fewer threads of the coil will be engaged by the bolt than when a relatively thin plate is fastened. Thus, the fastener of the present invention can be used to fasten plates or other objects of any thickness within the span of engagement of the bolt and key and will engage the plates by a partial turn of the bolt, the extent of which can also be adjusted.

From the foregoing it may be seen that three locking features are present to maintain the bolt in position even under severe vibration. First, the bolt tensioning spring 54 maintains the threads of the bolt in friction engagement with the helical coil to resist any rotation of the bolt, and the bolt is locked through the relaxed condition of the spring. Thus, it is necessary to exert a torque or winding force on the spring. Secondly, the tubular member which is non-rotatable with respect to the bolt is engaged by a friction fit with the socket to resist rotation. Thirdly, in order to be loosened by vibration the tubular member and bolt would necessarily be rotated in opposite directions and this is impossible since they are keyed together. That is, vibration would tend to rotate the tubular member downward which would necessitate clockwise rotation in FIGURE 3. On the contrary, vibration would tend to rotate the bolt upward in the socket which would require counterclockwise rotation. Since the bolt and tubular member are keyed together such movement cannot occur.

Various modifications and changes in the orientation and configuration of the parts of the present invention will be apparent in view of the foregoing description and drawing as well as reversal of engaging parts without change in their mode or method of operation within the scope of this invention as defined by the claims.

Thus, the present invention provides a quick operable fastener which has an optimum grip and utilizes maximum shear and tension surfaces without being susceptible to loosening by vibration and the like. The fastener is operated by a partial turn the extent of which can be adjusted. In addition, the fastener is adjustable to accommodate plates or other objects of varying thickness which are to be joined.

What is claimed is:

1. A quick connect and disconnect fastener assembly comprising: a bolt having male threads formed thereon; a receptacle for said bolt, said receptacle having female threads formed in the inner cylindrical surface thereof, said threaded receptacle adapted to receive said bolt without engagement of said threads; a helical coil mateable with and positioned within said female threads, said coil having a thickness substantially equal to the depth of said female threads, said male threads being mateable with said coil, the depth of said male threads being substantially less than the thickness of said coil and depth of said female threads; a first end of said coil affixed to said receptacle; a tubular male threaded member mateable with said female threads positioned within said receptacle, beneath the inward end of said bolt, said male threads of said tubular member being coextensive with said coil in said female threads, and terminating at a shoulder abutting said second end of said coil; and means for non-rotatably engaging said bolt and said member whereby rotation of said bolt rotates said member and reduces the diameter of said coil to engage said male threads and said female threads.

2. A quick connect and disconnect fastener assembly comprising: a bolt having male threads formed thereon; a receptacle for said bolt, said receptacle having female threads formed in the inner cylindrical surface thereof, said threaded receptacle adapted to receive said bolt without engagement of said threads; a helical coil mateable with and positioned within said female threads, said coil having a thickness substantially equal to the depth of said female threads, said male threads being mateable with said coil, the depth of said male threads being substantially less than the thickness of said coil and depth of said female threads; a first end of said coil affixed to said receptacle; a member rotatably positioned within said socket in co-acting relationship with the second end of said coil; said bolt defining a keyway extending into said bolt from the inward end thereof; a key member, said key member including means non-rotatably engageable wtih said rotatable member, said key member including means non-rotatably engageable with said bolt when said bolt is received into said receptacle so that rotation of said bolt rotates said rotatable member and moves said rotatable member to a position axially remote from said first end of said coil and thereby reduces the diameter of said coil to engage said male threads and said female threads; and means for varying the radial position of said key member wtih respect to said rotatable member.

3. A quick connect and disconnect fastener assembly comprising: a bolt having male threads formed thereon; a receptacle for said bolt, said receptacle having female threads formed in the inner cylindrical surface thereof, said threaded receptacle adapted to receive said bolt without engagement of said threads; a helical coil mateable with and positioned within said female threads, said coil having a thickness substantially equal to the depth of said female threads, said male threads being mateable with said coil, the depth of said male threads being substantially less than the thickness of said coil and depth of said female threads; a first end of said coil affixed to said receptacle; a tubular male threaded member mateable with said female threads positioned within said receptacle, beneath the inward end of said bolt, said male threads of said tubular member being coextensive with said coil in said female threads, and terminating at a shoulder abutting said second end of said coil; said bolt defining a keyway extending into said bolt from the inward end thereof; a key member said key member including means non-rotatably engageable with said tubular member, said key member including means non-rotatably engageable with said bolt when said bolt is received into said receptacle whereby rotation of said bolt rotates said member and reduces the diameter of said coil to engage said male threads and said female threads; and means for varying the axial position of said key member with respect to said tubular member.

4. A fastener comprising a receptacle having a cylindrical aperture therein, said aperture being provided with a helical groove; a helical coil in said groove, one end of said coil being fixed with respect to said receptacle, said groove being radially dimensioned to entirely receive said coil, said coil having a free diameter less than the diameter of said aperture; rotatable means threadably received in said receptacle and operatively engaging the opposite end of said coil for biasing said coil to a radially expanded position where said coil is fully received in said groove when said rotatable means is threadably advanced toward said one end of said coil; and a bolt having a cylindrical shank provided with a helical groove therein of the same pitch as said groove in said aperture, said shank being axially slidably insertable into said aperture, said bolt and said rotatable means including means rotatably coupling the same together when said shank is so inserted in said aperture whereby rotation of said bolt withdraws said rotatable means away from said one end of said coil and causes said coil to radially contract to a position simultaneously engaging said grooves in said aperture and in said shank.

References Cited in the file of this patent
UNITED STATES PATENTS

| | | |
|---|---|---|
| 1,630,958 | Mauch | May 31, 1927 |
| 2,334,687 | Moll | Nov. 16, 1943 |
| 2,665,931 | Vegren | Jan. 12, 1954 |